(12) United States Patent
Lee et al.

(10) Patent No.: US 11,166,197 B2
(45) Date of Patent: Nov. 2, 2021

(54) BACKHAUL BANDWIDTH MANAGEMENT METHOD AND SYSTEM FOR WIRELESS NETWORK

(71) Applicant: Arcadyan Technology Corporation, Hsinchu (TW)

(72) Inventors: Chih-Fang Lee, Hsinchu (TW); Ching-Fang Lin, Hsinchu (TW)

(73) Assignee: Arcadyan Technology Corporation

( * ) Notice: Subject to any disclaimer, the term of this patent is extended or adjusted under 35 U.S.C. 154(b) by 0 days.

(21) Appl. No.: 16/863,504

(22) Filed: Apr. 30, 2020

(65) Prior Publication Data
US 2020/0359266 A1 Nov. 12, 2020

(30) Foreign Application Priority Data
May 10, 2019 (TW) .................................. 108116180

(51) Int. Cl.
| | |
|---|---|
| *H04W 28/08* | (2009.01) |
| *H04B 17/318* | (2015.01) |
| *H04W 76/11* | (2018.01) |
| *H04W 8/24* | (2009.01) |
| *H04W 88/14* | (2009.01) |

(52) U.S. Cl.
CPC ...... *H04W 28/0983* (2020.05); *H04B 17/318* (2015.01); *H04W 8/24* (2013.01); *H04W 76/11* (2018.02); *H04W 88/14* (2013.01)

(58) Field of Classification Search
None
See application file for complete search history.

(56) References Cited

U.S. PATENT DOCUMENTS

| | | | |
|---|---|---|---|
| 2011/0211478 A1* | 9/2011 | Calvert | H04L 47/521 370/252 |
| 2017/0135104 A1* | 5/2017 | Emmanuel | H04W 40/12 |
| 2018/0054810 A1* | 2/2018 | Shinohara | H04W 72/0406 |

\* cited by examiner

*Primary Examiner* — Christine T Duong
(74) *Attorney, Agent, or Firm* — Innovation Counsel LLP

(57) ABSTRACT

A backhaul bandwidth management method for a wireless network is provided. Firstly, a backhaul connection mode is adjusted by a network device in a backhaul network according to a wireless capability. Then, a backhaul guaranteed bandwidth is guaranteed by the network device according to at least one of a dedicated service set identifier (SSID), a dedicated radio frequency (RF) band and a dedicated wireless mode. Then, a bandwidth allocation algorithm is executed by the network device to ensure that at least one backhaul transmission connection has the backhaul guaranteed bandwidth. Finally, a backhaul SSID is set to a first wireless network standard only mode by the network device to ensure that data transmission will not be interfered with by other network devices transmitting data according to a second wireless network standard in the backhaul network.

19 Claims, 5 Drawing Sheets

BACKHAUL BANDWIDTH MANAGEMENT METHOD AND SYSTEM FOR WIRELESS NETWORK

This application claims the benefit of Taiwan application Serial No. 108116180, filed May 10, 2019, the subject matter of which is incorporated herein by reference.

BACKGROUND OF THE INVENTION

Field of the Invention

The invention relates in general to a management technology for a backhaul network, and more particularly to a backhaul bandwidth management method and system for a wireless network.

Description of the Related Art

Conventional wireless local area network (wireless LAN) should have at least one wireless access point (AP), through which each connection device in the LAN can be connected to another node or domain. The wireless AP is implemented by a network device, for example, a router or a gateway, and the network device can be connected to an external network through the wireless AP.

A number of network devices configured as wireless APs are disposed within the LAN to form a network system, which enables the user equipment in the system to be connected a particular core packet data network. A number of network devices of the network system form a mesh network. Messages and data packets are transmitted between the network devices by a backhaul, which enables the user equipment to access the core packet data network.

If an LAN needs a wider coverage or services more user equipment connection service, more network devices configured as wireless APs will be needed to cover wider coverage or services more user equipment connection service. Conventional wireless LAN lacks effective measures in bandwidth management, therefore the network devices configured as wireless APs cannot effectively allocate the bandwidth to the connection of the user equipments or other network devices configured as wireless APs.

Currently, a number of wireless network standards are available. The IEEE 802.11ax standard and the IEEE 802.11ac standard are taken for example herein. The IEEE 802.11ax is a Wi-Fi standard of the next generation, and is also referred as Wi-Fi 6. In comparison to the evolution of the standards of earlier generations (such as 802.11a/b/g/n/ac), the 802.11ax standard focuses more on the flexible use of transmission with high efficiency, particularly in the environment of high-density Wi-Fi devices, than on the increase of the transmission rate.

The transmission speed that the 802.11ac standard can support is lower than that supported by the IEEE 802.11ax. If some network devices in the backhaul network fail to use the IEEE 802.11ac effectively, the backhaul network may not be able to transmit data at a higher speed due to the failure of some devices. Therefore, it has become a prominent task for the industry to provide a backhaul bandwidth management method to guarantee the transmission speed in the backhaul network.

SUMMARY OF THE INVENTION

The disclosure relates to a backhaul bandwidth management method and system for a wireless network. The backhaul bandwidth method and system of the disclosure are capable of effectively allocating bandwidths to the network devices in a backhaul network and guarantee the transmission speed in the backhaul network.

According to an embodiment of the present disclosure, a backhaul bandwidth management method for a wireless network is provided. Firstly, a backhaul connection mode is adjusted by a network device in a backhaul network according to a wireless capability. Then, a backhaul guaranteed bandwidth is guaranteed by the network device according to at least one of a dedicated SSID, a dedicated radio frequency (RF) band and a dedicated wireless mode. Then, a bandwidth allocation algorithm is executed by the network device to ensure that at least one backhaul transmission connection has the backhaul guaranteed bandwidth. Finally, a backhaul SSID is set to a first wireless network standard only mode by the network device to ensure that data transmission will not be interfered with by other network devices transmitting data according to a second wireless network standard in the backhaul network.

According to another embodiment of the present disclosure, a backhaul bandwidth management system is provided. The backhaul bandwidth management system has a backhaul network formed of a number of network devices. At least one of the network devices executes a backhaul bandwidth management method, including: adjusting a backhaul connection mode in a backhaul network according to a wireless capability; guaranteeing a backhaul guaranteed bandwidth according to at least one of a dedicated SSID, a dedicated RF band and a dedicated wireless mode; executing a bandwidth allocation algorithm to ensure that at least one backhaul transmission connection has the backhaul guaranteed bandwidth; and setting a backhaul SSID to a first wireless network standard only mode to ensure that data transmission will not be interfered with by other network devices transmitting data according to a second wireless network standard in the backhaul network.

The above and other aspects of the disclosure will become better understood with regards to the following detailed description of the preferred but non-limiting embodiment (s). The following description is made with reference to the accompanying drawings.

DETAILED DESCRIPTION OF THE DISCLOSURE

For the technical features of the present disclosure to be clearly understood, a number of exemplary embodiments are disclosed below with detailed descriptions. However, the exemplary embodiments are for explanatory and exemplary purposes only, not for limiting the scope of protection of the present disclosure.

Figure 1:
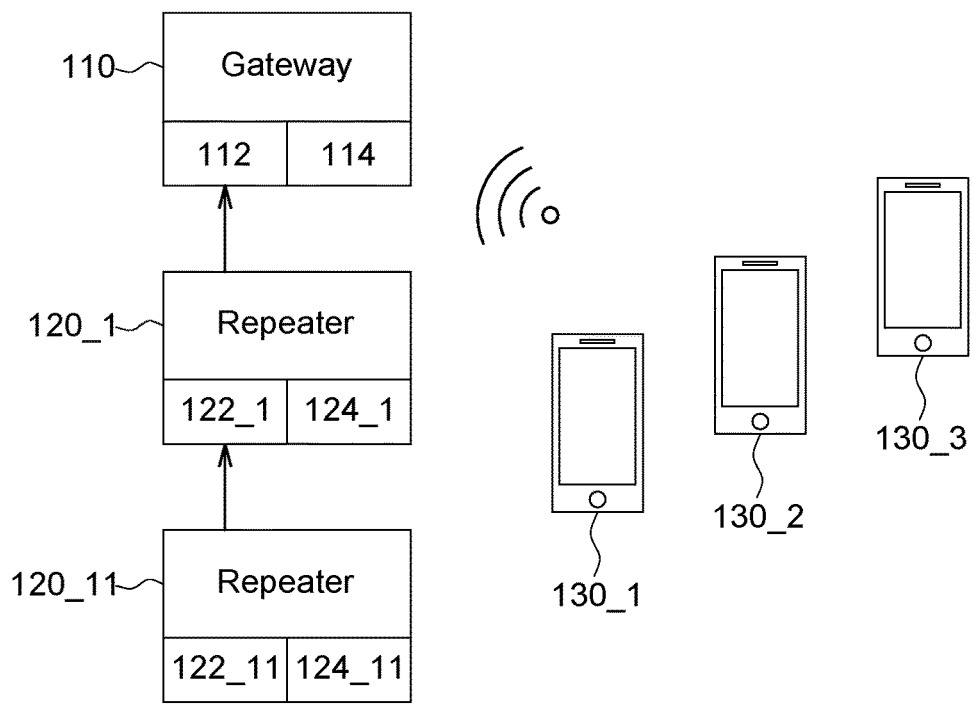
FIG. 1 is a schematic diagram of a backhaul bandwidth management system according to an embodiment of the disclosure.

Referring to FIG. 1, a schematic diagram of a backhaul bandwidth management system 100 according to an embodiment of the disclosure is shown. The backhaul bandwidth management system 100 includes a gateway 110, repeaters 120_1 and 120_11 and user devices 130_1~130_3. In the present embodiment, the gateway 110 and the repeaters 120_1 and 120_11 are examples of the network devices of the disclosure. The gateway 110 and the repeaters 120_1 and 120_11 can be connected through wired and/or wireless connection for receiving and transmitting data streams. The gateway 110 and the repeaters 120_1 and 120_11 can be operated at an access point (AP) mode and configured as AP device to provide a Wi-Fi service to a user device (such as user devices 130_1~130_3). The user devices 130_1~130_3 can be, for example, set-top boxes, personal computers, TVs or other terminal devices.

In the present embodiment, the gateway 110 and the repeaters 120_1 and 120_11 are examples of the network devices of the disclosure. Although 2 repeaters, 1 gateway, and 3 user devices are illustrated in FIG. 1, the amount and connection method of the network devices illustrated in FIG. 1 are not for limiting the scope of protection of the disclosure. Generally speaking, the amount and connection method of the network devices are not subjected to specific restrictions. A number of network devices configured as wireless APs can be disposed in the same LAN to form a network system allowing the user devices (such as user devices 130_1~130_3) within the network system to be connected to a core packet data network and form a backhaul network.

In the present embodiment, the repeater 120_1 and the network device of the previous layer thereof, that is, the gateway 110, are connected by a backhaul service set identifier (backhaul SSID) 112. Since both the repeater 120_1 and the gateway 110 support the IEEE 802.11ax standard, the backhaul transmission connection is high-speed transmission connection supporting the IEEE 802.11ax standard and guaranteeing the backhaul guaranteed bandwidth of the backhaul transmission connection. The repeater 120_11 and the network device of the previous layer thereof, that is, the repeater 120_1, can also be connected by the backhaul SSID 122_1. Since the repeater 120_1 and the repeater 120_11 both support the IEEE 802.11ax standard, the backhaul transmission connection is high-speed transmission connection supporting the IEEE 802.11ax standard and guaranteeing the backhaul guaranteed bandwidth of the backhaul transmission connection.

Besides, the user devices 130_1~130_3 and the gateway 110 are connected by the user service set identifier (user SSID) 114 and share the bandwidth. In the present embodiment, the wireless network standard that the user devices 130_1~130_3 can support is not restricted. The user devices 130_1~130_3 can be connected to the gateway 110 according to the IEEE 802.11ac standard, the IEEE 802.11g standard, the IEEE 802.11n standard, the IEEE 802.11ax standard or other wireless network standards. Since the IEEE 802.11ax standard has better downward compatibility and higher transmission speed than the IEEE 802.11ac standard, the IEEE 802.11g standard, and the IEEE 802.11n standard, the gateway 110 can be connected to the repeater 120_1 and the user devices 130_1~130_3 by the backhaul SSID 112 and the user SSID 114 to ensure that the backhaul transmission connection between the gateway 110 and the repeater 120_1 will not be interfered with by other user devices transmitting data at a lower transmission speed.

In another embodiment of the disclosure, the user device (not shown) and the repeater 120_1 can be connected by the user SSID 124_1 and share the bandwidth. The repeater 120_1 can be connected to the repeater 120_11 and the user device (not shown) by the backhaul SSID 122_1 and the user SSID 124_1, respectively, to ensure that the backhaul transmission connection between the repeater 120_1 and the repeater 120_11 will not be interfered with by other user devices transmitting data at a lower transmission speed.

In other embodiments of the disclosure, the user device (not shown) and the repeater 120_1 can be connected by the user SSID 124_1 and share the bandwidth.

Figure 2:
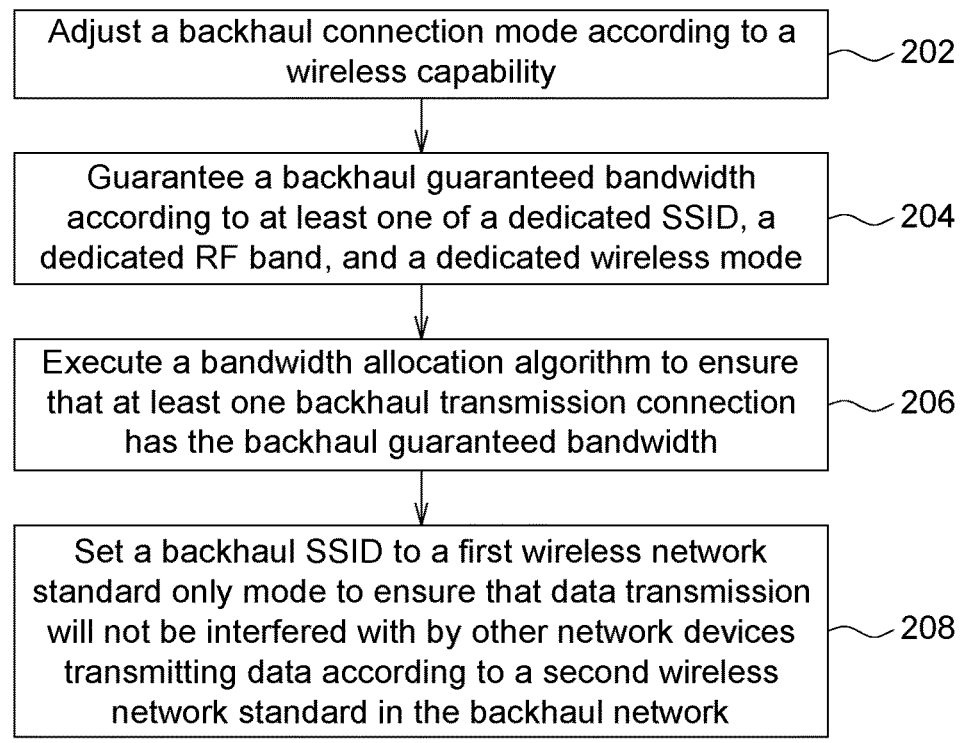
FIG. 2 is a flowchart of a backhaul bandwidth management method according to an embodiment of the disclosure.

Each network device of FIG. 1 can execute the backhaul bandwidth management method of FIG. 2 to guarantee the bandwidth in the backhaul transmission connection. The backhaul bandwidth management method can be implemented in the network device in the form of software, firmware, or circuit.

Referring to FIG. 2, a flowchart of a backhaul bandwidth management method according to an embodiment of the disclosure is shown. Firstly, the method begins at step 202, in which a backhaul connection mode is adjusted by a network device according to a wireless capability between the network device and wireless network. In step 204, a backhaul guaranteed bandwidth is guaranteed by the network device according to at least one of a dedicated SSID, a dedicated radio frequency (RF) band and a dedicated wireless mode. In step 206, a bandwidth allocation algorithm is executed by the network device to ensure that at least one backhaul transmission connection has the backhaul guaranteed bandwidth. In step 208, a backhaul SSID is set to a first wireless network standard only mode by the network device to ensure that data transmission will not be interfered with by other network devices transmitting data according to a second wireless network standard in the backhaul network. At the first wireless network standard only mode, data is transmitted according to the first wireless network standard only, which has better downward compatibility and higher transmission speed than the second wireless network standard.

Figure 3A:
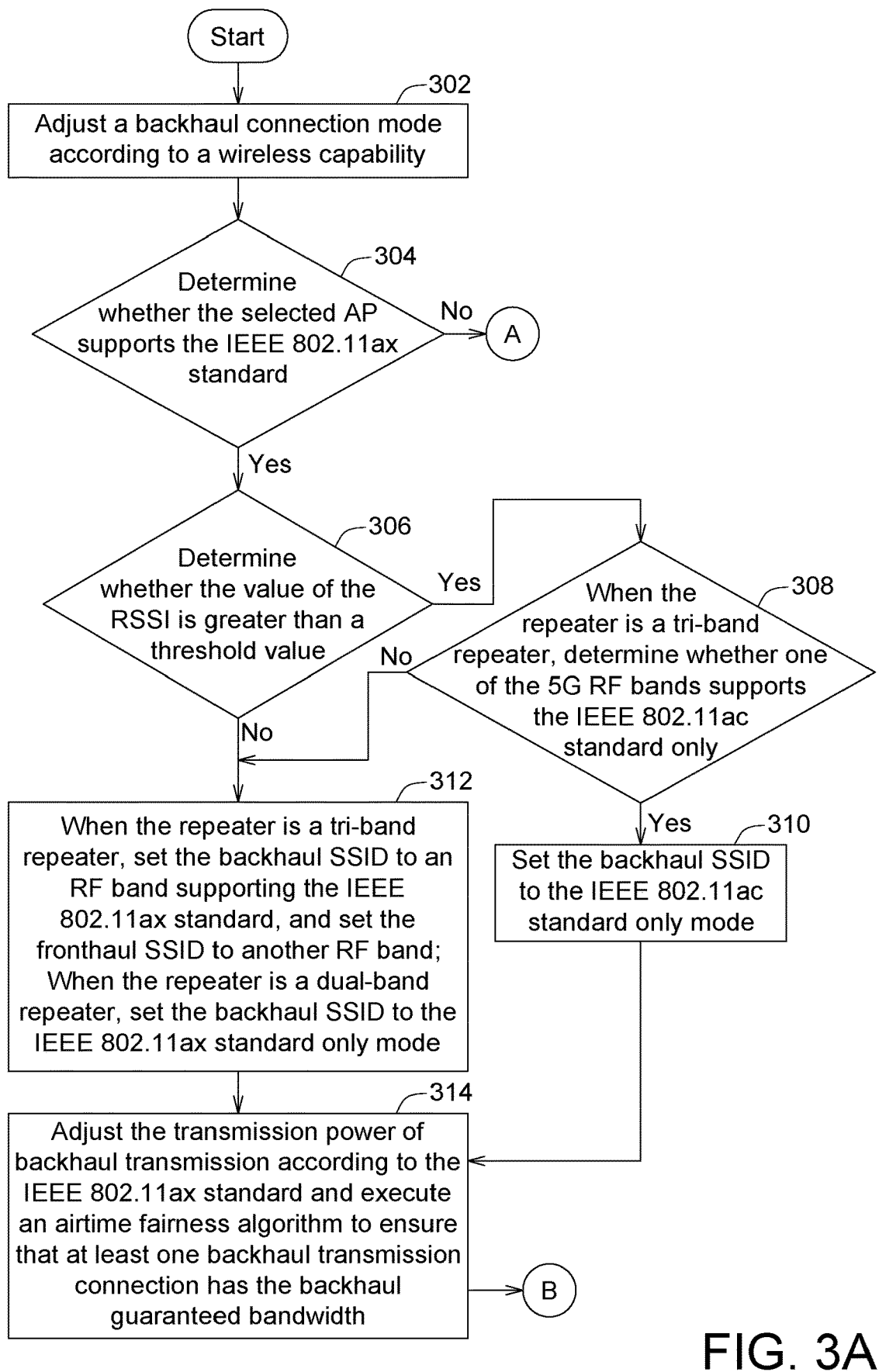
FIGS. 3A-3C are flowcharts of a backhaul bandwidth management method implemented by the repeater of FIG. 1 according to an embodiment of the disclosure.
Figure 3B:
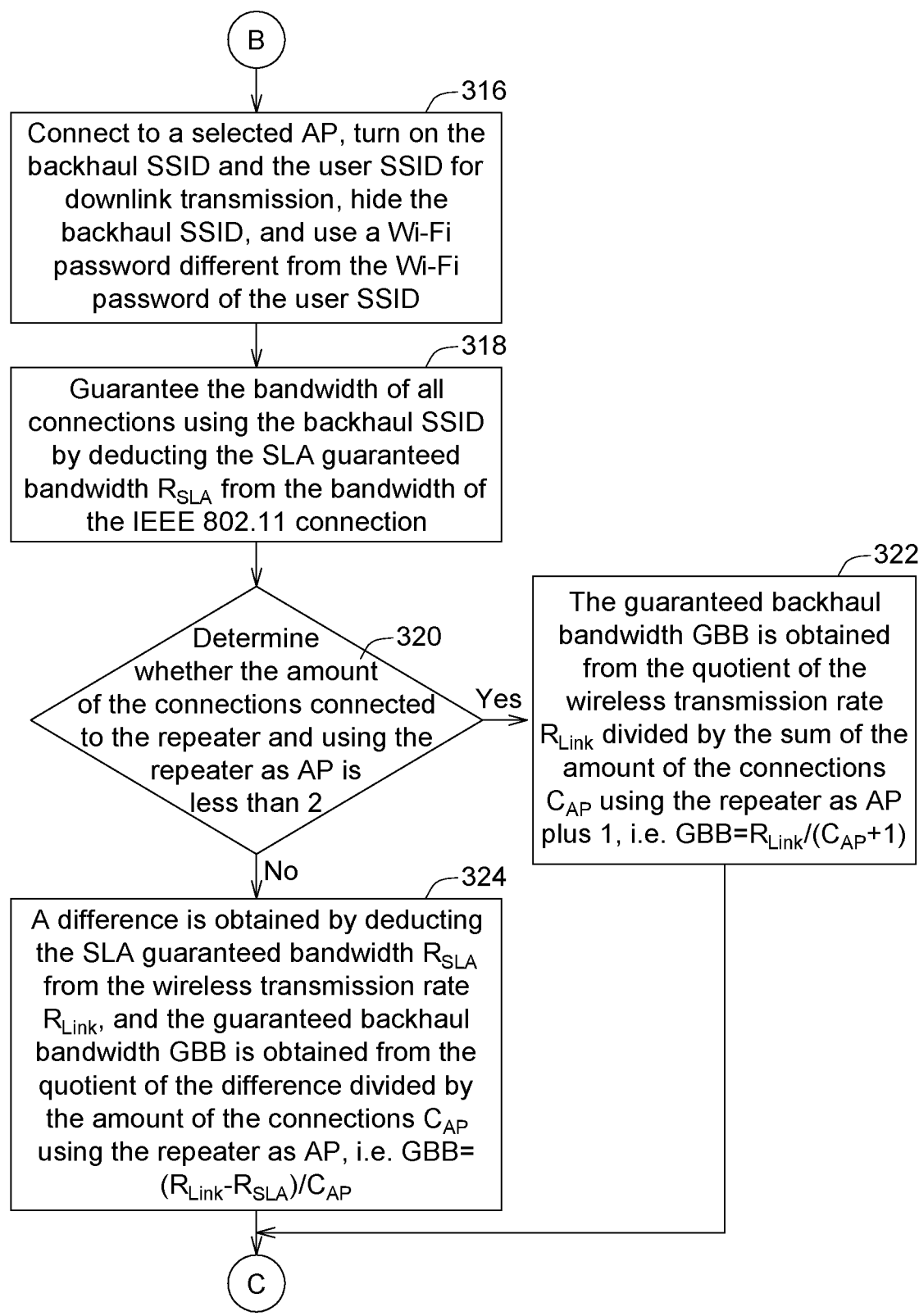
Figure 3C:
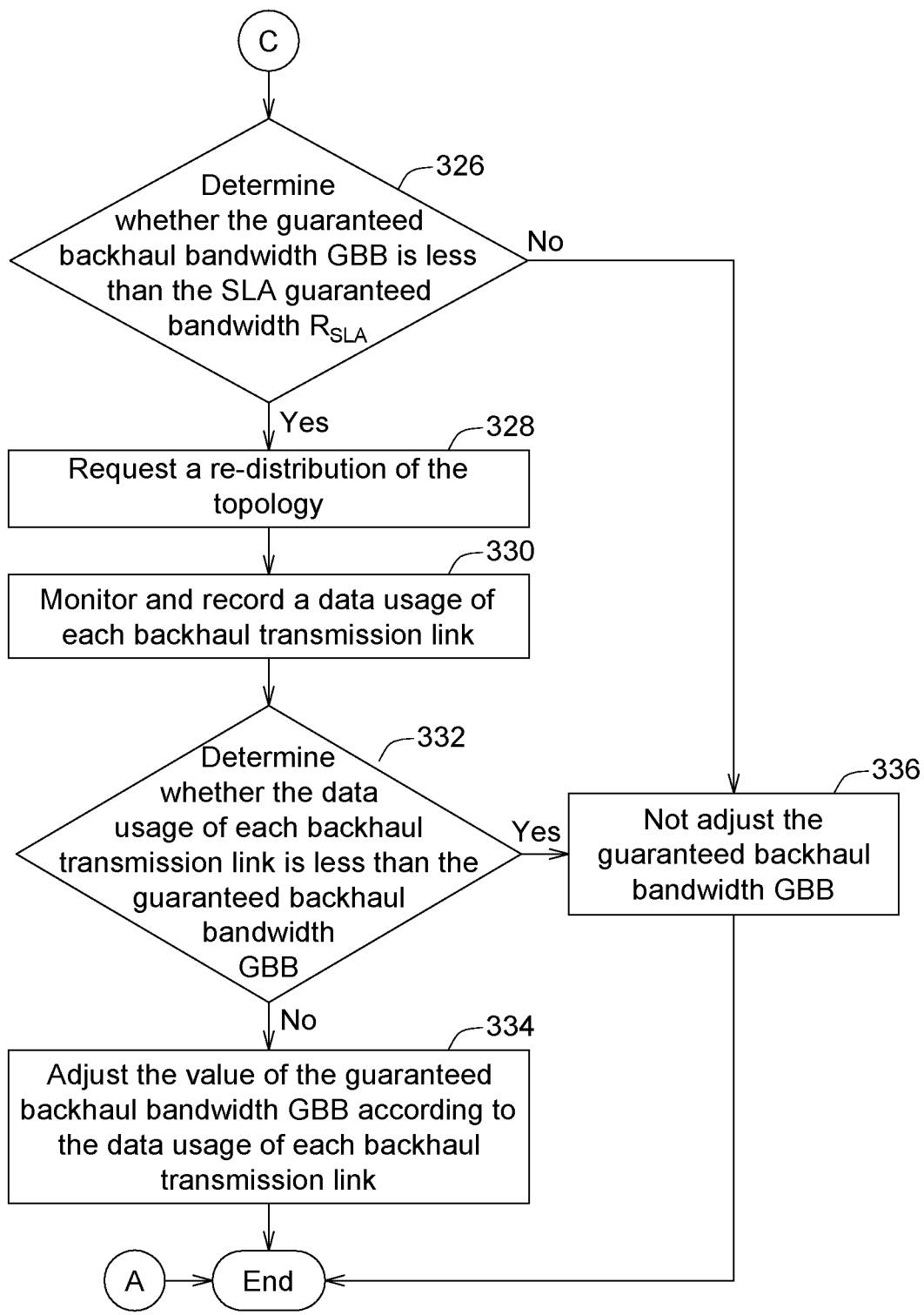

Detailed descriptions of the disclosure are further exemplified below by the repeater 120_1. Refer to FIG. 1 and FIGS. 3A-3C simultaneously. FIGS. 3A-3C are flowcharts of a backhaul bandwidth management method implemented by the repeater 120_1 of FIG. 1 according to an embodiment of the disclosure.

As indicated in FIG. 3A, the method begins at step 302, a backhaul connection mode is adjusted by the repeater 120_1 according to a wireless capability. Since the repeater 120_1 can support the network standard having higher transmission speed, the network standard is exemplified by the IEEE 802.11ax standard here. Whenever the repeater 120_1 intends to join the wireless network, the repeater 120_1 will prioritize the AP supporting the IEEE 802.11ax standard, determine the wireless capability according to at least one of a hop count, an amount of RF bands (such as dual-band or tri-band) of the repeater 120_1, and a received signal strength indicator (RSSI) received by the repeater 120_1, and select an AP according to the result of determination.

In step 304, whether the selected AP supports the EEE 802.11ax standard is determined by the repeater 120_1.

If the result of determination in step 304 is "Yes", that is, the repeater 120_1 determines that the selected AP supports the IEEE 802.11ax standard, the method proceeds to step 306, whether the value of the RSSI is greater than a threshold value is determined.

If the result of determination in step 306 is "Yes", that is, the repeater 120_1 determines that the RSSI is greater than the threshold value, the method proceeds to step 308, when the repeater 120_1 is a tri-band repeater, whether one of the 5G RF bands supports the IEEE 802.11ac standard only is determined.

If the result of determination in step 308 is "Yes", that is, the repeater 120_1 is a tri-band repeater and the 5G RF band supports the IEEE 802.11ac standard only, the method proceeds to step 310, the backhaul service set identifier (backhaul SSID) is set to the IEEE 802.11ac standard only mode, in which data is transmitted according to the IEEE 802.11ac standard only.

If the result of determination in step 306 is "No", that is, the RSSI received by the repeater 120_1 is less than the threshold value, the method proceeds to step 312. If the result of determination in step 308 is "No", that is, the repeater 120_1 is a tri-band repeater and the 5G RF band supports not only the IEEE 802.11ac standard, the method proceeds to step 312. In step 312, when the repeater 120_1 is a tri-band repeater, the backhaul SSID is set to an RF band supporting the IEEE 802.11ax standard, and the front haul SSID is set to another RF band. When the repeater 120_1 is a dual-band repeater, the backhaul SSID is set to the IEEE 802.11ax standard only mode, in which data is transmitted according to the IEEE 802.11ax standard only.

In step 314, the transmission power of backhaul transmission is adjusted by the repeater 120_1 according to the IEEE 802.11ax standard to increase the backhaul transmission distance, and an airtime fairness algorithm is executed by the repeater 120_1 to ensure that at least one backhaul transmission connection has the backhaul guaranteed bandwidth. Details of the repeater 120_1 executing an airtime fairness algorithm to ensure that at least one backhaul transmission connection has the backhaul guaranteed bandwidth are disclosed below.

As indicated in FIG. 3B, in step 316, the repeater 120_1 is connected to a selected AP. Meanwhile, refer to FIG. 1. The selected AP to which the repeater 120_1 is connected is the gateway 110. The repeater 120_1 further turns on the backhaul SSID and the user SSID for downlink transmission, hides the backhaul SSID, and uses a Wi-Fi password different from the Wi-Fi password of the user SSID to avoid the user device getting connected to the network by the backhaul SSID.

In step 318, the bandwidth of all connections using the backhaul SSID is guaranteed by the repeater 120_1 which deducts the service level agreement (SLA) guaranteed bandwidth $R_{SLA}$ from the bandwidth of the IEEE 802.11 connection, wherein SLA, also referred as service level agreement protocol (SLA protocol), is a formal agreement between service providers and clients. The most common component of the SLA is providing service to the clients as stipulated in the agreement. For example, the Internet providers and the telecommunication company normally include an SLA clause in their contracts with the clients.

In step 320, whether the amount of the connections connected to the repeater 120_1 and using the repeater 120_1 as AP is less than 2 is determined by the repeater 120_1.

When the result of determination in step 320 is "Yes", that is, the amount of the connections connected to the repeater 120_1 and using the repeater 120_1 as AP is less than 2, the method proceeds to step 322, a guaranteed backhaul bandwidth GBB can be obtained according to the formula: GBB=$R_{Link}/(C_{AP}+1)$. That is, the guaranteed backhaul bandwidth GBB is obtained from the quotient of the wireless transmission rate $R_{Link}$ divided by the sum of the amount of the connections $C_{AP}$ using the repeater 120_1 as AP plus 1.

Refer to FIG. 1, the amount of the connection lines using the repeater 120_1 as AP is only 1, that is, the connection of the repeater 120_11, and the guaranteed backhaul bandwidth GBB is obtained as: 2.4G/2=1200 M.

When the result of determination in step 320 is "No", that is, the amount of the connections using the repeater 120_1 as AP is not less than 2, the method proceeds to step 324, the guaranteed backhaul bandwidth GBB can be obtained according to the formula: GBB=$(R_{Link}-R_{SLA})/C_{AP}$. That is, a difference is obtained by deducting the SLA guaranteed bandwidth $R_{SLA}$ from the wireless transmission rate $R_{Link}$, and the guaranteed backhaul bandwidth GBB is obtained from the quotient of the difference divided by the amount of the connections $C_{AP}$ using the repeater 120_1 as AP. Also, details of obtaining the guaranteed backhaul bandwidth GBB when the network bandwidth management system has different network devices are disclosed below with accompanying drawing FIG. 4.

As indicated in FIG. 3C, in step 326, whether the guaranteed backhaul bandwidth GBB is less than the SLA guaranteed bandwidth $R_{SLA}$ is determined by the repeater 120_1.

When the result of determination in step 326 is "Yes", that is, the guaranteed backhaul bandwidth GBB is less than the SLA guaranteed bandwidth $R_{SLA}$, which implies that too many connections are using the repeater 120_1 as AP, the method proceeds to step 328, the repeater 120_1 requests a re-distribution of the topology, that is, each network device of FIG. 1 can request to re-adjust the topology, but only the gateway 110 has the right to adjust the topology, that is, to check if any repeater connected thereto can be directed to other band or other AP of the previous layer, such that the hop count or the amount of repeaters connected thereto can be reduced.

In step 330, a data usage of each backhaul transmission link is monitored and recorded by the repeater 120_1.

In step 332, whether the data usage of each backhaul transmission link is less than the guaranteed backhaul bandwidth GBB is determined by the repeater 120_1.

When the result of determination in step 332 is "No", that is, the data usage of each backhaul transmission link is not less than the guaranteed backhaul bandwidth GBB, the method proceeds to step 334, the value of the guaranteed backhaul bandwidth GBB is adjusted according to the data usage of each backhaul transmission link.

If the result of determination in step 332 is "Yes", that is, the data usage of each backhaul transmission link is less than the guaranteed backhaul bandwidth GBB, the method proceeds to step 336, the guaranteed backhaul bandwidth GBB is not adjusted.

Additionally, when the result of determination in step 326 is "No", that is, the guaranteed backhaul bandwidth GBB is not less than the SLA guaranteed bandwidth $R_{SLA}$, the method proceeds to step 336, the guaranteed backhaul bandwidth GBB is not adjusted.

FIGS. 3A-3C illustrate detailed flowcharts for implementing the network bandwidth management method by the repeater 120_1 according to an embodiment of the disclosure. However, the network bandwidth management method does not necessarily include all steps of FIGS. 3A-3C. Furthermore, in the method described in FIGS. 3A-3C, the steps can be implemented at any order unless the relationship such as "before" and "after" or the logic relationship based on the result of determination are clearly specified. The descriptions of order such as "firstly" and "then" does not mean to limit the sequence of the steps.

Figure 4:
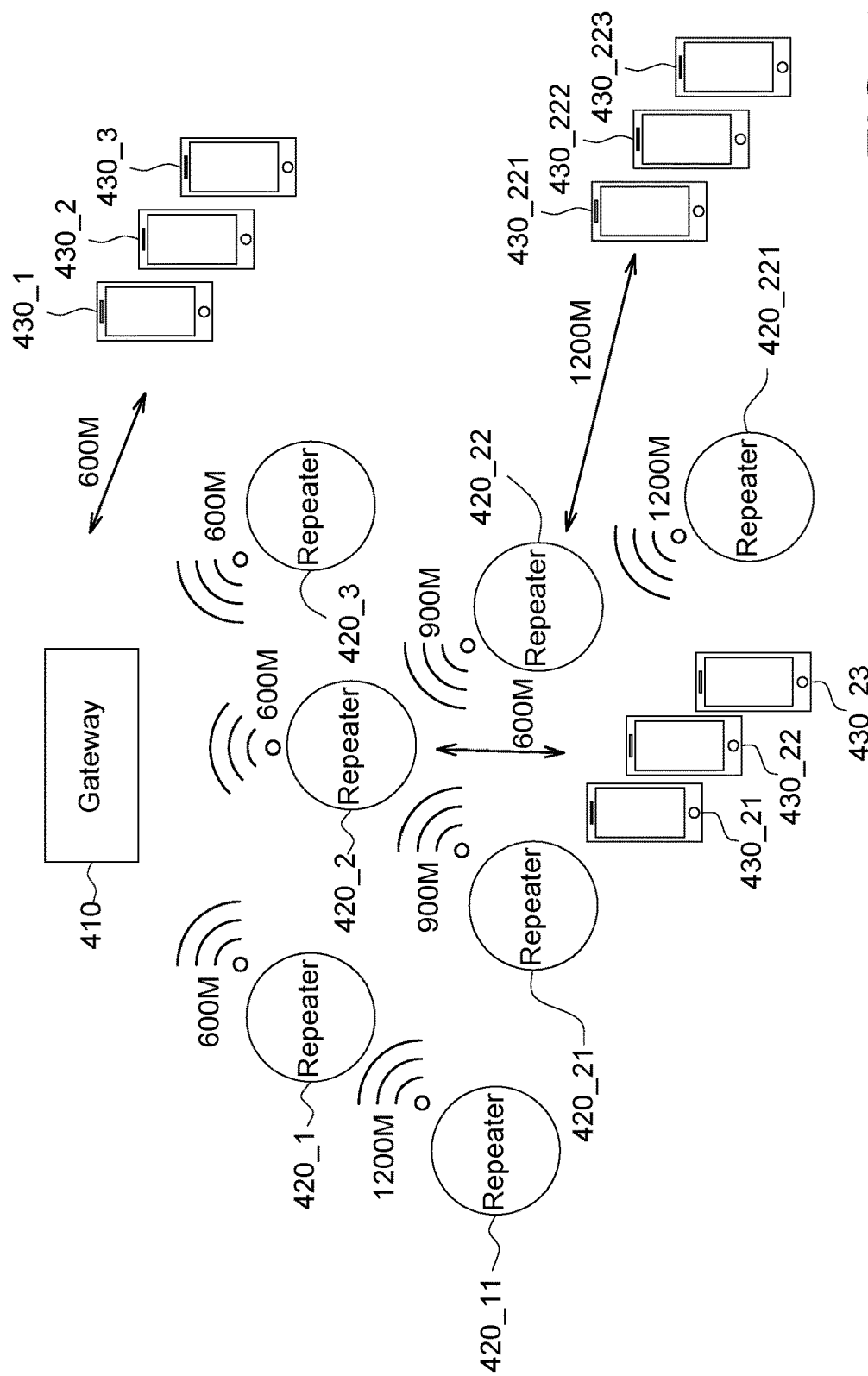
FIG. 4 is a schematic diagram of a backhaul bandwidth management system according to another embodiment of the disclosure.

FIG. 4 is a schematic diagram of a backhaul bandwidth management system 400 according to another embodiment of the disclosure.

The backhaul bandwidth management system 400 includes a gateway 410, repeaters 420_1~420_3, 420_11, 420_21~420_22, and 420_221 and user devices 430_1~430_3, 430_21~420_23, 430_221 and 420_223. In the present embodiment, the gateway 410 and the repeaters 420_1, 420_2, 420_3, 420_11, 420_21, 420_22, and 420_221 are examples of the network devices of the disclosure. The gateway 410 and the repeaters 420_1~420_3, 420_11, 420_21~420_22, and 420_221 can be connected through wireless and/or wireless connection for receiving and transmitting data streams. The gateway 410 and the repeater 420_1, 420_2, 420_3, 420_11, 420_21~420_22, and 420_221 can be operated at an AP mode and configured as AP devices to provide Wi-Fi service to user devices (such as 430_1~430_3, 430_21~420_23, 430_221, and 420_223). The user devices 430_1~4303, 430_21~420_23, 430_221, and 420_223 can be implemented by, for example, set-top boxes, personal computers, TVs, or other terminal devices, and the SLA guaranteed bandwidth $R_{SLA}$ for the user devices 430_1~430_3, 430_21~420_23, 430_221, and 420_223 is 600 Mb.

In the present embodiment, the repeaters 420_1~420_3 are connected to the network device of the previous layer thereof, that is, the gateway 410, by the backhaul SSID (not shown), and the repeaters 420_1~420_3 and the gateway 410 all support the IEEE 802.11ax standard, therefore the backhaul transmission connection is a high-speed transmission connection supporting the IEEE 802.11ax standard. Since the amount of post-transmission connections connected to the gateway 410 is 3, and the user devices 430_1~430_3 are also connected to the gateway 410, the guaranteed backhaul bandwidth GBB can be obtained according to the formula: $GBB=(R_{Link}-R_{SLA})/G_{AP}$. That is, a difference is obtained by deducting the SLA guaranteed bandwidth $R_{SLA}$ from the wireless transmission rate $R_{Link}$, and the guaranteed backhaul bandwidth GBB is obtained from the quotient of the difference divided by the amount $G_{AP}$ of the connections using the gateway 410 as AP. In the present embodiment, GBB=(2.4G−600 Mb)/3=600 Mb. In other words, the guaranteed bandwidth for the uploading connection from the repeaters 420_1~420_3 to the gateway 410 is 600 Mb.

In the present embodiment, the repeater 420_11 is connected to the network device of the previous layer thereof, that is, the repeater 4201, by the backhaul SSID (not shown), and the repeater 420_11 and the repeater 420_1 both support the IEEE 802.11ax standard, therefore the backhaul transmission connection is a high-speed transmission connection supporting the IEEE 802.11ax standard. Since the amount of backhaul transmission connections connected to the repeater 420_1 is 1, the guaranteed backhaul bandwidth GBB can be obtained according to the formula: $GBB=R_{Link}/(G_{AP}+1)$. That is, the guaranteed backhaul bandwidth GBB is obtained from the quotient of the wireless transmission rate $R_{Link}$ divided by the sum of the amount $G_{AP}$ of the connections using the repeater 420_1 as AP plus 1. In the present embodiment, GBB=2.4G/2=1200 Mb. In other words, the guaranteed bandwidth for the uploading connection from the repeater 420_11 to the repeater 420_1 is 1200 Mb.

In the present embodiment, the repeaters 420_21~420_22 are connected to the network device of the previous layer thereof, that is, the repeater 420_2, by the backhaul SSID (not shown), and the repeaters 420_21~420_22 and the repeater 420_2 all support the IEEE 802.11ax standard, therefore the backhaul transmission connection is a high-speed transmission connection supporting the IEEE 802.11ax standard. Since the amount of backhaul transmission connections connected to the repeater 420_2 is 2, and the user devices 43021~420_23 are also connected to the repeater 420_2, the guaranteed backhaul bandwidth GBB can be obtained according to the formula: $GBB=(R_{Link}-R_{SLA})/G_{AP}$. That is, a difference is obtained by deducting the SLA guaranteed bandwidth $R_{SLA}$ from the wireless transmission rate $R_{Link}$, and the guaranteed backhaul bandwidth GBB is obtained from the quotient of the difference divided by the amount $G_{AP}$ of the connections using the repeater 420_2 as AP. In the present embodiment, GBB=(2.4G−600 Mb)/2=900 Mb. In other words, the guaranteed bandwidth for the uploading connection from the repeaters 420_21~420_22 to the repeater 420_2 is 900 Mb.

In the present embodiment, the repeater 420_221 is connected to the network device of the previous layer thereof, that is, the repeater 420_22, by the backhaul SSID (not shown), the repeater 420_221 and the repeater 420_22 both support the IEEE 802.11ax standard, therefore the backhaul transmission connection is a high-speed transmission connection supporting the IEEE 802.11ax standard. Since the amount of backhaul transmission connections connected to the repeater 420_22 is 1, and the user devices 430_221~420_223 are connected to the repeater 420_22, the guaranteed backhaul bandwidth GBB can be obtained according to the formula: $GBB=R_{Link}/(G_{AP}+1)$. That is, the guaranteed backhaul bandwidth GBB still can be obtained from the quotient of the wireless transmission rate $R_{Link}$ divided by the sum of the amount $G_{AP}$ of the connections using the repeater 420_22 as AP plus 1. In the present embodiment, GBB=2.4G/2=1200 Mb. In other words, the guaranteed bandwidth for the uploading connection from the repeater 420_221 to the repeater 420_22 is 1200 Mb. Since the guaranteed backhaul bandwidth GBB is 1200 Mb, the bandwidth that can be allocated to the user devices 430_221~420_223 by the repeater 420_22 will increase to 1200 Mb.

In another embodiment of the disclosure, the network devices/the repeaters 420_22, 420_2, and 420_3 all have an 802.11ac RF band and at least one 802.11ax RF band. When the repeater 420_22 intends to be connected to the gateway 410, the uplink path that can be operated at the 802.11ac RF band will be prioritized and selected according to the RSSI between the repeater 420_22 and the repeater 420_2 or the repeater 420_3. This is because the repeaters normally are disposed apart with a not short distance, and the theoretic maximum transmission rate of the 802.11ax standard being 4803 Mbps and the theoretic maximum transmission rate of the 802.11ac being 4333 Mbps can only be achieved when the two devices are very close to each other and are operated at the environment of 80 MHz, MIMO antennas 8×8, and 1024-quadrature amplitude modulation (QAM).

Conversely, when mesh network wireless repeaters are used in order to have a wider coverage of LAN, the repeaters normally are not disposed too close to each other to avoid data cannot be transmitted with the modulation at the maximum transmission rate. Normally, when data can be transmitted at 64-QAM modulation, the performance would be good enough. Meanwhile, the theoretic maximum transmission rate is: 802.11ax=2882 Mbps, 802.11ac=2600 Mbps. Under such circumstances, the 802.11ac standard is prioritized and selected as the uplink operating RF band, and the transmission rate achieved by the 802.11ac RF band is similar to that achieved by the 802.11ax RF band, such that the 802.11ax RF band can be reserved for the downlink transmission (providing access to the user equipments and other repeaters). The 802.11ax standard focuses more on the flexible use of transmission with high efficiency, particularly in the environment of high-density Wi-Fi devices existing, than on the increase of the transmission rate. Therefore, the 802.11ax is more suitable for the downlink operating RF band which simultaneously provides access to multiple user equipments/clients/other repeaters.

Furthermore, the 802.11ax RF band is configured as the uplink operating RF band only when the uplink RSSI of the repeater 420_22/network device is below the predetermined threshold value. This is because the 802.11ax RF band can transmit data at a frequency of 2.4 GHz to reach a farther distance, or the 802.11ax RF band can increase the transmission output power and transmit data at a frequency of 5 GHz or 6 GHz, or the 802.11ax RF band can use the 802.11ax dedicated transmission mode to reduce signal interference caused by the 802.11a/b/g/n/ac devices.

Meanwhile, the 802.11ac RF band can be sued as a downlink operating RF band, which manages the bandwidth allocation time of the 802.11ac RF band by executing an airtime fairness algorithm to allocate less time to the user equipment having worse transmission efficiency (because it will occupy a longer duration of transmission time) and allocate more time to the user equipment having better transmission efficiency (because it will quickly finish the transmission of data). Thus, the overall efficiency will be increased and the 802.11ac RF band can be used at a better efficiency. Meanwhile, the bandwidth can be prioritized and allocated to the access of other repeater to ensure that the repeater 420_221 of the next layer can provide better connection quality to the user equipment.

In theory, all RF bands can achieve best efficiency when all RF band is the RF band of 802.11ax standard. However, at the initial stage when the 802.11ax standard is still not popular, production capacity may not be enough and the quality may not be stable. Conversely, the 802.11ac has become a very mature standard/product nowadays, and the achieved efficiency can be similar to that of the 802.11ax standard/product, particularly when the 802.11ac standard/product is combined with the 802.11ax RF band and configured as default uplink dedicated operating RF band for the repeaters in a mesh network.

To summarize, the backhaul bandwidth management method and system for a wireless network of the disclosure are used in a backhaul network formed of a number of network devices. Each network device can adjust a backhaul connection mode according to a wireless capability to ensure that the speed of data transmission in the backhaul network will not be interfered by other network devices transmitting data at a lower transmission speed. The network devices respectively perform transmission with other network devices and user devices by using different SSID to guarantee the transmission speed in the backhaul network. The network devices can effectively allocate bandwidth by executing a bandwidth allocation algorithm to ensure that each backhaul transmission connection has the backhaul guaranteed bandwidth.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backhaul bandwidth management method for a wireless network, wherein the backhaul bandwidth management method comprises:
    adjusting a backhaul connection mode by a network device in a backhaul network according to a wireless capability;
    guaranteeing a backhaul guaranteed bandwidth by the network device according to at least one of a dedicated service set identifier (SSID), a dedicated radio frequency (RF) band and a dedicated wireless mode;
    executing a bandwidth allocation algorithm by the network device to ensure that at least one backhaul transmission connection has the backhaul guaranteed bandwidth; and
    setting a backhaul SSID to a first wireless network standard only mode by the network device to ensure that data transmission will not be interfered with by other network devices transmitting data according to a second wireless network standard in the backhaul network;
    wherein when amount of connections using the network device as an access point (AP) is less than 2, the backhaul guaranteed bandwidth is obtained based on a wireless transmission rate and the amount of the connections using the network device as the AP.

2. The backhaul bandwidth management method according to claim 1, wherein at the first wireless network standard only mode, data is transmitted according to the first wireless network standard only, the first wireless network standard has better downward compatibility and higher transmission speed than the second wireless network standard.

3. The backhaul bandwidth management method according to claim 2, wherein the first wireless network standard is the IEEE 802.11ax standard, and the second wireless network standard is 802.11ac standard.

4. The backhaul bandwidth management method according to claim 1, wherein the step of adjusting the backhaul connection mode by the network device in the backhaul network according to the wireless capability comprises:
    determining the wireless capability according to at least one of a hop count, an amount of RF bands and a received signal strength indicator (RSSI).

5. The backhaul bandwidth management method according to claim 1, wherein the step of executing the bandwidth allocation algorithm by the network device to ensure that the at least one backhaul transmission connection has the backhaul guaranteed bandwidth comprises:
    executing an airtime fairness algorithm to ensure that at least one backhaul transmission connection has the backhaul guaranteed bandwidth.

6. The backhaul bandwidth management method according to claim 5, wherein the step of executing the bandwidth allocation algorithm by the network device to ensure that the at least one backhaul transmission connection has the backhaul guaranteed bandwidth comprises:
    calculating the amount of the at least one backhaul transmission connection to guarantee the backhaul guaranteed bandwidth.

7. The backhaul bandwidth management method according to claim 5, wherein the step of executing the bandwidth allocation algorithm by the network device to ensure that the at least one backhaul transmission connection has the backhaul guaranteed bandwidth comprises:
    calculating a hop count to guarantee the backhaul guaranteed bandwidth.

8. The backhaul bandwidth management method according to claim 1, further comprising:
adjusting a transmission power of the network device to increase a backhaul transmission distance.

9. The backhaul network bandwidth management method according to claim 1, wherein the network device is a repeater or a gateway.

10. A backhaul bandwidth management system, comprising:
a backhaul network formed of a plurality of network devices, wherein at least one of the network devices executes a backhaul bandwidth management method, comprising:
adjusting a backhaul connection mode in a backhaul network according to a wireless capability;
guaranteeing a backhaul guaranteed bandwidth according to at least one of a dedicated SSID, a dedicated radio frequency (RF) band and a dedicated wireless mode;
executing a bandwidth allocation algorithm to ensure that at least one backhaul transmission connection has the backhaul guaranteed bandwidth; and
setting a backhaul SSID to a first wireless network standard only mode to ensure that data transmission will not be interfered with by other network devices transmitting data according to a second wireless network standard in the backhaul network;
wherein when amount of connections using the network device as an access point (AP) is less than 2, the backhaul guaranteed bandwidth is obtained based on a wireless transmission rate and the amount of the connections using the network device as the AP.

11. The backhaul bandwidth management system according to claim 10, wherein at the first wireless network standard only mode, data is transmitted according to the first wireless network standard only, the first wireless network standard has better downward compatibility and higher transmission speed than the second wireless network standard.

12. The backhaul bandwidth management system according to claim 11, wherein the first wireless network standard is the IEEE 802.11ax standard, and the second wireless network standard is 802.11ac standard.

13. The backhaul bandwidth management system according to claim 11, wherein the wireless capability is determined according to at least one of a hop count, an amount of RF bands and a received signal strength indicator (RSSI).

14. The backhaul bandwidth management system according to claim 11, wherein the bandwidth allocation algorithm is an airtime fairness algorithm.

15. The backhaul bandwidth management system according to claim 14, wherein executing the bandwidth allocation algorithm by the network device to ensure that the at least one backhaul transmission connection has the backhaul guaranteed bandwidth comprises:
calculating the amount of the at least one backhaul transmission connection to guarantee the backhaul guaranteed bandwidth.

16. The backhaul bandwidth management system according to claim 14, wherein executing the bandwidth allocation algorithm by the network device to ensure that the at least one backhaul transmission connection has the backhaul guaranteed bandwidth comprises:
calculating a hop count to guarantee the backhaul guaranteed bandwidth.

17. The backhaul bandwidth management system according to claim 14, wherein the backhaul bandwidth management method further comprises:
adjusting a transmission power of the network device to increase a backhaul transmission distance.

18. The backhaul bandwidth management system according to claim 11, wherein the network device is a repeater or a gateway.

19. The backhaul bandwidth management system according to claim 11, wherein the backhaul bandwidth management method is implemented in the network device in the form of software, firmware, or circuit.

* * * * *